April 28, 1942. S. B. KURZINA, JR 2,281,099
BACKPEDALING BRAKE FOR VELOCIPEDES
Filed June 26, 1940 2 Sheets-Sheet 1
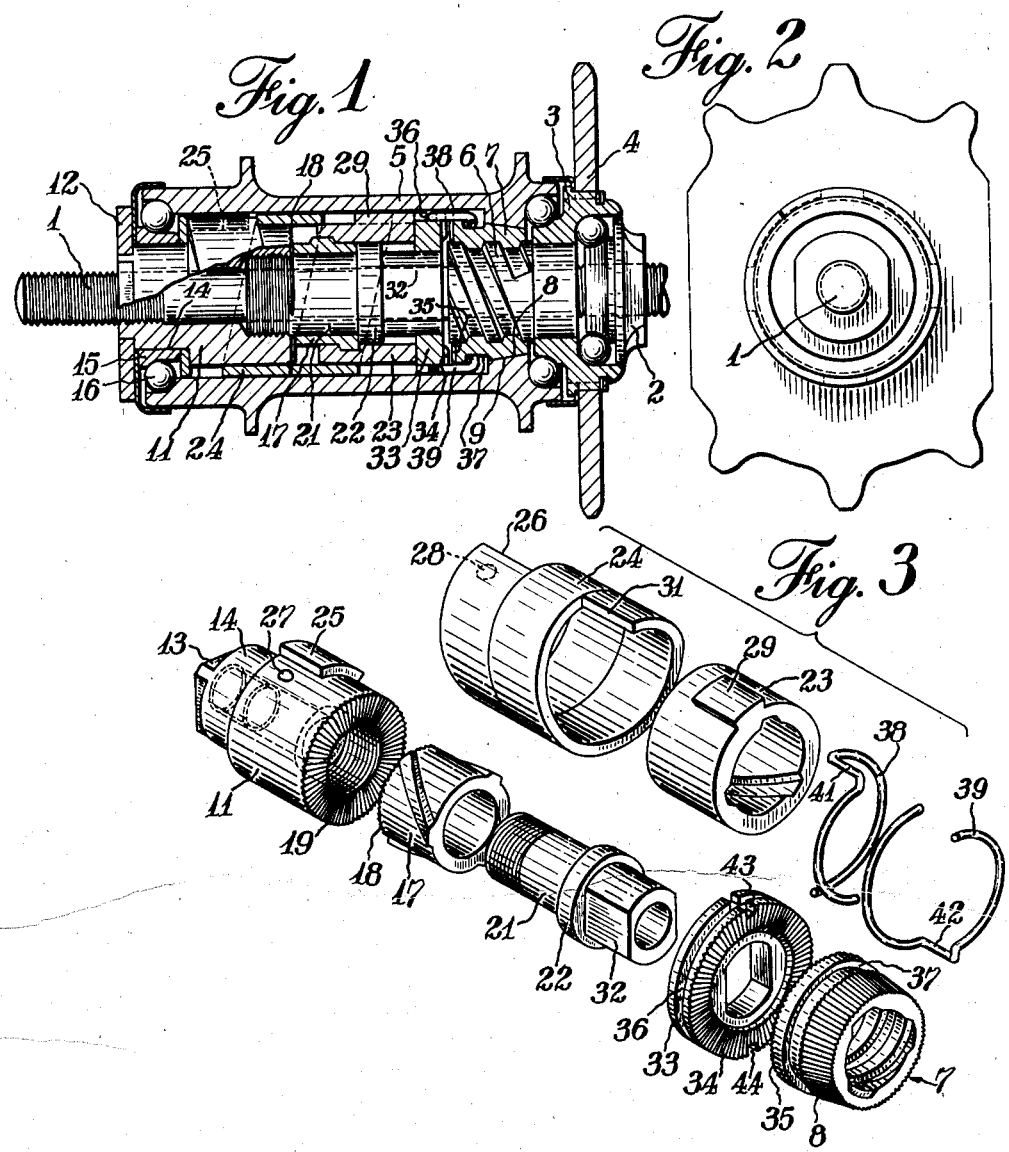
INVENTOR.
Stanley B. Kurzina Jr.
BY Clinton S. Janes.
ATTORNEY.
Witness:
Burr W. Jones April 28, 1942.  S. B. KURZINA, JR  2,281,099
BACKPEDALING BRAKE FOR VELOCIPEDES
Filed June 26, 1940  2 Sheets-Sheet 2
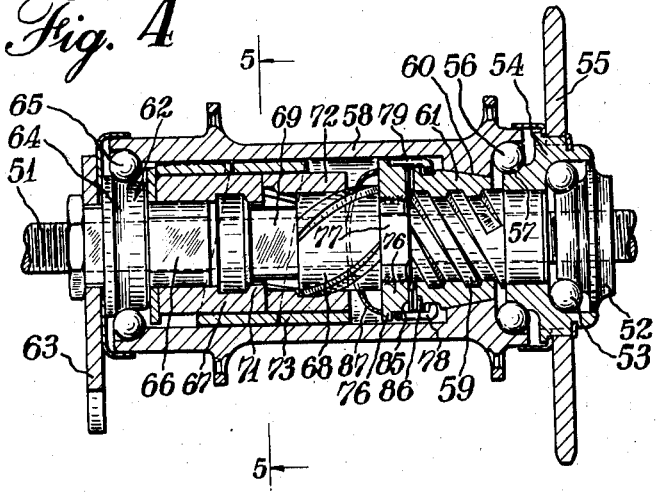
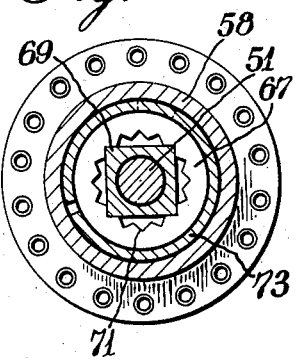
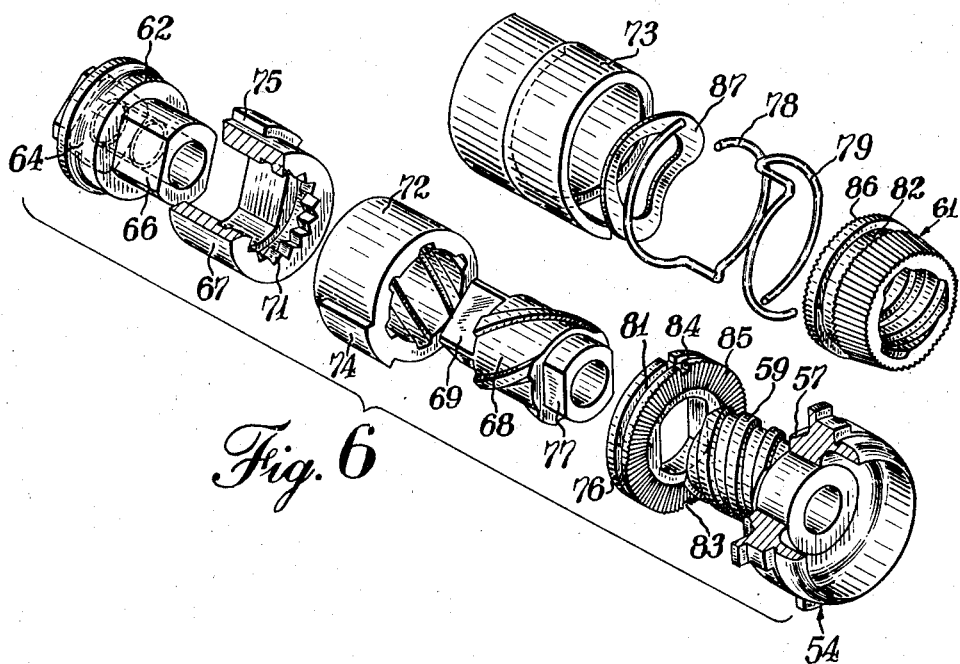
INVENTOR.
Stanley B. Kurzina Jr.
BY Clinton S. Janes
ATTORNEY.
Witness:
Burr W. Jones Patented Apr. 28, 1942

2,281,099

UNITED STATES PATENT OFFICE 2,281,099

BACKPEDALING BRAKE FOR VELOCIPEDES

Stanley B. Kurzina, Jr., Elmira, N. Y., assignor to Bendix Aviation Corporation, South Bend, Ind., a corporation of Delaware Application June 26, 1940, Serial No. 342,485

10 Claims. (Cl. 192—6)

The present invention relates to a backpedaling brake for velocipedes and more particularly to an internally expanding hub brake of the coil spring type.

In hub brakes for bicycles, the cost of manufacture is importantly affected by the diameter of the hub shell. It is therefore desirable both on the grounds of lightness and economy that the size of the hub be reduced as much as possible compatibly with effective operation of the brake. The coil spring type of internal expanding brake when arranged for servo action has been found to operate so efficiently both as respects braking torque and heat dissipation as to provide satisfactory operation with comparatively small hub shells. Proper release of the brake mechanism, however, entails the use of a stiff coil spring for the brake, and this in turn necessitates an efficient form of controlling means if the application of the brake is to be effected with slight muscular effort on the part of the operator. Moreover, in brakes of small radius, the parts which transmit the braking torque are subjected to quite heavy stresses and must be designed and dimensioned to retain their effectiveness under such conditions. Since frictional braking must necessarily entail wear of the braking surfaces, the conditions above outlined make it very desirable that some form of accurate adjustment of the parts be provided in order to retain the maximum efficiency of operation of the brake throughout the life of the parts thereof.

It is an object of the present invention to provide a novel backpedaling brake which is efficient and reliable in operation while being simple and economical in construction.

It is another object to provide such a device incorporating a coil spring brake which is self-energizing in its action.

It is another object to provide such a device incorporating strong and rigid anchoring means for the brake.

It is a further object to provide such a device having effective and dependable controlling means for the brake.

It is another object to provide such a device having provisions whereby lost motion of the parts due to manufacturing tolerances and/or wear in use, may be easily taken up so as to maintain the effectiveness of the brake over long periods of use.

It is another object to provide such a device in which the adjusting means for taking up lost motion is simple and positive in character and capable of fine adjustment.

It is another object to provide such a device in which the assembly and disassembly of the brake is easily accomplished without special tools or equipment.

Further objects and advantages will be apparent from the following description taken in connection with the accompanying drawings in which:

Fig. 1 is a side elevation partly in section and partly broken away of a hub brake incorporating a preferred embodiment of the invention;

Fig. 2 is an end view thereof from the right in Fig. 1;

Fig. 3 is a view in perspective of the various operating parts of the brake shown in disassembled relation;

Fig. 4 is a view similar to Fig. 1 showing a second embodiment of the invention;

Fig. 5 is a section taken substantially on the line 5—5 of Fig. 4; and

Fig. 6 is a detail in perspective showing the operating parts of the brake mechanism illustrated in Fig. 4 in disassembled relation and partly broken away to show interior construction.

In Fig. 1 of the drawings there is illustrated a stationary axle member 1 threaded at its ends and carrying at one end an adjustable bearing cone member 2 for a driving member 3 on which is rigidly mounted in any suitable manner a drive sprocket 4. Driving member 3 is formed as a bearing cone member for one end of a hub shell 5, and has rigidly fixed therein in any suitable manner as by brazing, a screw shaft 6 which is thus rotatably mounted on the axle 1. Anti-friction bearing balls are preferably interposed as illustrated between the cone member 2, driving member 3 and hub 5.

Means for rotating the hub shell 5 in a forward direction from the driving member 3 is provided in the form of a clutch member 7 threaded on the screw shaft 6 and provided with a conical clutch surface 8 (Fig. 3) which is preferably knurled, as shown, for engagement with a corresponding internal surface 9 of the hub shell 5.

An anchor member 11 is threaded on the opposite end of the axle 1 from the bearing member 2, and is held from rotation by any suitable means such as a brake arm 12 having a non-circular opening conforming to a flattened portion 13 on the end of the anchor member. It will be understood that the free end of the brake arm 12 will be attached to the frame of the vehicle in any preferred manner in order to prevent rotation thereof. Anchor member 11 is provided with a cylindrical surface 14 for the reception of a bearing cone 15 on which the adjacent end of the hub shell 5 is mounted as by means of anti-friction bearings 16.

A reaction member in the form of a hollow screw shaft 17 is mounted in alignment with the anchor member 11 and arranged to be non-rotatably connected thereto as by means of interengaging dental surfaces 18 and 19 respectively. Means for locking these members together is provided in the form of a clamping sleeve 21 journalled on the axle 1 traversing the screw shaft 17 and threaded into the adjacent end of the anchor member 11. Sleeve 21 is provided with a shoulder 22 arranged to engage the end of the screw shaft 17 in order to clamp the screw shaft to the anchor member. Preferably the sleeve and anchor member are so threaded that the torque transmitted to the sleeve when the brake is being applied tends to tighten the threaded connection. As shown in Fig. 3, this is here accomplished by providing the sleeve and anchor member with left hand threads.

A brake actuating member 23 is threaded on the screw shaft 17 and is formed with a generally cylindrical exterior surface of the same diameter as the main body of the anchor member 11.

A brake member 24 in the form of a coiled spring having flattened convolutions is mounted freely on the anchor member 11 and brake actuating member 23. Anchor member 11 is provided with an abutment shoulder 25 formed integrally therewith or fixed immovably thereon, and the adjacent end 26 of the brake member 24 is maintained in engagement with said abutment by any suitable means such as a pin or lug 27 fixed in or formed on the anchor member and engaging in an opening or pocket 28 formed in the brake member adjacent said end. Brake actuating member 23 is provided with an abutment member 29 formed thereon or affixed thereto, which abutment member is adapted to engage the free end 31 of the brake member when the parts are in assembled position.

The clamping sleeve 21 is provided with an extension 32 of non-circular cross section, and a thrust member 33 having a central opening conforming thereto is slidably mounted thereon. One side of the thrust member 33 is provided with a dental surface 34 arranged to engage a similar surface 35 formed on the adjacent end of the clutch nut 7. The periphery of the thrust member 33 is provided with a groove 36, the periphery of the clutch nut 7 is provided with a wider groove 37, and one or more detent springs 38, 39 are so mounted in said grooves as to cause the thrust member 33 to travel longitudinally with the clutch nut 7, sufficient lost motion being provided by the width of the groove 37 in the clutch nut to permit engagement and disengagement of the dental surfaces 34 and 35 of the thrust member and clutch nut. Detent springs 38 and 39 are non-rotatably connected to the thrust member 33 by means of straight portions 41 and 42 of the detents bearing in longitudinal notches 43 and 44 in the periphery of the thrust member. The portions of the detent springs 38, 39 which engage in the groove 37 of the clutch nut are arranged to bear frictionally on the bottom of the groove so as to constitute a yielding detent for resisting rotation of the nut so as to assure traversal thereof when the screw shaft 6 is rotated by the operator.

In operation, forward rotation of the driving member 3 by the sprocket 4 causes the clutch nut 7 to be traversed to the right in Fig. 1 into clutching engagement with the interior clutch surface 9 of the hub shell 5, whereupon the hub shell is locked to the driving member to rotate in unison therewith. If the operator ceases to rotate the sprocket 4, continued rotation of the hub shell 5 by momentum of the vehicle causes the clutch nut 7 to overrun the screw shaft 6 so as to move slightly to the left, thus disengaging itself from the hub shell which is thus allowed to overrun freely, or "coast."

Backward rotation of the sprocket 4 by the operator causes the screw shaft 6 to rotate backward in unison therewith, and since rotation of the clutch nut 7 is resisted by the detent springs 38, 39, the clutch nut will thereby be traversed to the left until the dental surface 35 thereof engages the similar surface 34 on the thrust member 33. The clutch nut is thus locked positively from backward rotation since the thrust member 33 is prevented from rotation due to its splined connection with the clamping sleeve 21. Further backward rotation of the sprocket 4 then causes the clutch nut 7 to move the thrust member 33 to the left in Fig. 1, which motion is transmitted to the brake actuating member 23. Since the brake actuating member is threaded on the stationary screw shaft 17, this longitudinal motion causes rotation of the brake actuating member in a forward direction whereby the lug 29 thereon is caused to apply pressure to the free end 31 of the brake sleeve 24. The brake sleeve is thus expanded into engagement with the interior of the hub shell 5 to apply a frictional retarding force to the hub shell. The reaction of the braking force is taken by the anchor member 11 through engagement of the end 26 of the brake against the abutment 25 on the anchor member, and is transmitted through the brake arm 12 to the frame of the vehicle. It will be appreciated that since the brake member 24 is wound, as illustrated, in such a direction that its braking effect on the hub shell tends to further expand the brake member, the brake is self-energizing in its action so that the force necessary to apply the brake may be comparatively small.

When, in consequence of long use of the brake or for any other reason, it is desired to take up lost motion in the parts of the brake actuating mechanism, it is merely necessary to unscrew the clamping sleeve 21 from the anchor member 11 sufficiently to disengage the dental surfaces 18, 19 of the screw shaft 17 and anchor member. The screw shaft 17 may then be adjusted rotarily to bring the abutment 29 of the brake actuating member 23 which is threaded thereon, into close engagement with the end 31 of the brake member 24 when member 23 is at the limit of its travel to the right in Fig. 1. The clamping sleeve 21 is then again tightened up so as to hold the screw shaft 17 in its adjusted position against the anchor member 11.

In the embodiment of the invention illustrated in Figs. 4, 5 and 6 the principle of operation of the brake is the same as in the embodiment previously described, but another form of operating and adjusting mechanism is illustrated. As there shown, a stationary axle 51 threaded at both ends has a bearing cone 52 threaded on one end thereof for the reception of anti-friction bearings 53 which support a driving member 54. A drive sprocket 55 is fixed in any suitable manner on the driving member 54 and serves to transmit rotation thereto in the usual manner. Anti-friction bearings 56 running on a suitable cone surface 57 of the driving member, support the adjacent end of a hub shell 58. A screw shaft 59 is rigidly connected to the driving member 54 as by welding or brazing and has mounted thereon a conical clutch nut 61 adapted to engage a corresponding clutch surface 60 in the hub shell 58.

An anchor member 62 is threaded on the end of the axle 51 opposite the bearing cone 52 and is prevented from rotation by a brake arm 63 non-rotatably connected thereto and attached in any suitable manner to the frame of the vehicle. A bearing cone 64 on the anchor member cooperates with anti-friction bearings 65 to support rotatively the adjacent end of the hub shell.

The anchor member 62 is provided with an extension 66 in the form of a cylinder with one or more flat surfaces formed thereon, and an abutment member 67 having an interior bore conforming to the extension 66 is non-rotatably mounted thereon. A reaction member in the form of a hollow screw sleeve 68 is loosely mounted on the axle 51 and is provided with an extension 69 of polygonal outline here shown as square. The adjacent end of the abutment member 67 is provided with an opening having an inner periphery provided with notches or serrations 71. As best illustrated in Fig. 5, this opening is preferably formed with sixteen notches of a size and shape adapted to slidably receive the squared end 69 of the screw sleeve 68. The screw sleeve 68 is thus splined to the abutment member 71 with provision for adjustment into any one of sixteen angular positions.

A brake actuating member 72 is threaded on the screw sleeve 68 adjacent the abutment member 67 and is provided with an exterior cylindrical surface which forms an extension of the cylindrical exterior surface of the abutment member 67. A spiral spring brake member 73 is loosely mounted on the brake actuating member 72 and abutment member 67 with its ends in engagement with abutment blocks 74 and 75 on said members respectively.

A thrust member 76 is rigidly mounted on an extension 77 of the screw sleeve 68 as by welding or brazing. Thrust member 76 is connected for longitudinal movement with the clutch nut 61 by means of spring members 78 and 79 bearing in peripheral grooves 81 and 82 in the thrust member and clutch nut respectively and non-rotatably connected to the clutch nut by engagement in peripheral notches 83 and 84 thereof. The adjacent end surfaces of thrust member 76 and clutch nut 61 are provided with dental surfaces 85 and 86 respectively, and groove 82 in the clutch nut is of sufficient width to permit relative longitudinal movement of these members to engage and disengage said dental surfaces. Springs 78 and 79 bear frictionally in the groove 82 in order to resist rotation thereof and thus insure traversal of the clutch nut when the screw shaft 59 is rotated by the operator.

Means for yieldingly maintaining the brake operating member 72 in engagement with the abutment member 67 and for assisting in returning the thrust member 76 and screw sleeve 68 to their idle positions, is provided in the form of a warped spring member 87 encircling the screw sleeve 68 and interposed between the thrust member 76 and the brake actuating member 72.

The operation of this embodiment of the invention in so far as forward drive and coasting is concerned, is the same as the embodiment previously described. Backward rotation of the screw shaft 59 by the operator through the sprocket 55 causes the nut clutch member 61 to be traversed to the left in Fig. 4 into engagement with the thrust member 76, and further backward rotation of the screw shaft causes the nut 61, thrust member 76 and screw sleeve 68 to slide in unison to the left, rotation thereof being prevented by the splined engagement of the square extension 69 of the screw sleeve in the notches 71 of the abutment member 67. This longitudinal movement of the screw sleeve 68 causes rotation of the brake actuating member 72 in a forward direction inasmuch as it is prevented from longitudinal movement by its engagement with the end of the abutment member 67. This forward rotary movement of the brake actuating member causes the brake member 73 to be expanded by virtue of the engagement of the abutment block 74 therewith, whereby the brake member is caused to frictionally engage the interior of the hub shell 58. The braking reaction is transmitted through the abutment block 75 to the abutment member 67 and through the anchor member 62 to the brake arm 63 attached to the vehicle frame.

As best shown in Fig. 6, the screw sleeve 68 is provided with a triple thread, while the brake actuating member 72 is provided with six thread-grooves. This arrangement, in conjunction with the adjustable connection between the screw sleeve 68 and the anchor member 67, provides a differential adjustment for the brake actuating member 72 whereby lost motion of the parts may readily be taken up in a satisfactory manner. The arrangement here shown provides rotary adjustment of the brake actuating member in increments of 7½ degrees, but it will be appreciated that if such a fine adjustment is not deemed necessary, a less number of threads and of notches 71 may be employed.

Although but two embodiments of the invention have been shown and described in detail, it will be understood that other embodiments are possible and various changes may be made in the design and arrangements of the parts without departing from the spirit of the invention as defined in the claims appended hereto.

What is claimed is:

1. In a backpedaling brake for velocipedes, a hub, a spiral brake member therein, a fixed anchor preventing rotation of the brake in a forward direction, and manually operable means for rotating the free end of the brake member in a forward direction including a non-rotatable screw shaft, an actuating sleeve threaded thereon, and means causing relative longitudinal movement between the screw shaft and sleeve.

2. In a backpedaling brake for velocipedes, a hub, a spiral brake member therein, a fixed anchor preventing rotation of the brake in a forward direction, driving means for the hub, and means operable by backward rotation of the driving means for rotating the free end of the brake member in a forward direction including a screw shaft having an adjustable non-rotatable connection with the anchor, and an actuating sleeve having a multiple threaded connection with the screw shaft.

3. In a coaster brake for bicycles, a hub, a spiral brake member therein, a fixed anchor for one end of the brake member preventing forward rotation thereof, a screw sleeve adjustably splined to the anchor, a brake actuating member threaded on the screw sleeve in abutting relation with the anchor and having a radial projection engaging the free end of the brake member, driving means for the hub, and means operable by backward rotation of the driving means for moving the screw sleeve longitudinally to thereby cause forward rotation of the brake actuating member.

4. A backpedaling brake for velocipedes including a hub, a brake member adapted to engage frictionally therein, a fixed anchor for the brake member, and manually operable means for applying the brake including a reaction member non-rotatably connected to the anchor member, said non-rotatable connection being adjustable to take up lost motion in the brake applying means.

5. A backpedaling brake for velocipedes including a hub, a brake member adapted to engage frictionally therein, a fixed anchor for the brake member, manually operable means for applying the brake including a reaction member non-rotatably connected to the anchor member by means providing a plurality of angularly spaced positions of the reaction member, and an actuating member for the brake member having a plural threaded connection with the reaction member cooperating with the connection of the reaction member to the anchor member to provide a differential rotary adjustment of the actuating member.

6. In a backpedaling brake for velocipedes, a hub, a brake member therein, an anchor for the brake member, a reaction member splined to the anchor, an actuating member threaded on the reaction member in abutting relation to the anchor, driving means for the hub, means responsive to backward rotation of the driving means for moving the reaction member longitudinally, and means whereby the consequent rotation of the actuating member expands the brake member into engagement with the hub.

7. In a backpedaling brake for velocipedes, a hub, a spiral brake member therein, an anchor for one end of the brake member, a reaction member splined to the anchor, an actuating member threaded on the reaction member in abutting relation to the anchor, driving means for the hub, means responsive to backward rotation of the driving means for moving the reaction member longitudinally, and means whereby the consequent rotation of the actuating member is transmitted to the free end of the brake member to move it into engagement with the hub.

8. A coaster brake for bicycles including a coiled brake member, a fixed anchor for one end of the brake member, a reaction member splined to the anchor with provision for rotary adjustment, an actuating member threaded on the reaction member in abutting relation to the anchor, and manually operable means for moving the reaction member longitudinally.

9. A coaster brake for bicycles including a coiled brake member, a fixed anchor for one end of the brake member, a reaction member splined to the anchor with provision for rotary adjustment, an actuating member threaded on the reaction member with a multiple thread in abutting relation to the anchor, manually operable means for moving the reaction member longitudinally, and means whereby the consequent rotation of the actuating member rotates the free end of the brake member to expand the brake member, the rotary adjustment of the reaction member cooperating with the multi-threaded connection of the actuating member to provide a differential rotary adjustment of the latter.

10. In a backpedaling brake for velocipedes a hub, a coiled spring brake member therein, an anchor member having an abutment engaging one end of the brake member and preventing forward rotation thereof, a reaction member non-rotatably connected to the anchor member, and actuating means for the brake including an actuating member having an inclined connection with the reaction member and having an abutment adapted to engage and impart forward rotation to the free end of the brake member, driving means for the hub, and means including a non-rotatable thrust member actuated by backward rotation of the driving means to cause relative longitudinal movement between the actuating member and reaction member, said connection between the reaction member and anchor member having means for positive angular adjustment in order to take up lost motion in the brake actuating means.

STANLEY B. KURZINA, Jr.